US008046987B2

(12) United States Patent
Wilmot et al.

(10) Patent No.: US 8,046,987 B2
(45) Date of Patent: Nov. 1, 2011

(54) AIR COOLED CORE MOUNTED IGNITION SYSTEM

(75) Inventors: Theodore Steven Wilmot, Laurens, SC (US); Ryan Gilbert Kelbey, Cleveland, SC (US)

(73) Assignee: Woodard, Inc., Fort Collins, CO (US)

( * ) Notice: Subject to any disclaimer, the term of this patent is extended or adjusted under 35 U.S.C. 154(b) by 644 days.

(21) Appl. No.: 12/203,712

(22) Filed: Sep. 3, 2008

(65) Prior Publication Data

US 2010/0052836 A1 Mar. 4, 2010

(51) Int. Cl.
*F02C 7/266* (2006.01)

(52) U.S. Cl. ..................... 60/39.827; 60/39.821; 60/776

(58) Field of Classification Search ............... 60/39.827, 60/39.821, 39.83, 776, 796, 800; 102/202.8, 102/202.14; 431/258–266

See application file for complete search history.

(56) References Cited

U.S. PATENT DOCUMENTS

| | | | | |
|---|---|---|---|---|
| 2,286,233 | A * | 6/1942 | Scott | 60/39.827 |
| 4,504,030 | A * | 3/1985 | Kniat et al. | 244/57 |
| 5,936,830 | A * | 8/1999 | Rousseau et al. | 361/253 |
| 7,130,180 | B2 | 10/2006 | Kempinski | |
| 2002/0170293 | A1 | 11/2002 | Farmer et al. | |
| 2003/0163995 | A1 | 9/2003 | White | |
| 2005/0072163 | A1 | 4/2005 | Wells et al. | |
| 2006/0016190 | A1 | 1/2006 | Howell et al. | |
| 2006/0037326 | A1* | 2/2006 | Mehrer et al. | 60/39.821 |
| 2007/0137210 | A1* | 6/2007 | Costello et al. | 60/39.83 |
| 2007/0256426 | A1* | 11/2007 | Dooley | 60/776 |

* cited by examiner

*Primary Examiner* — William Rodriguez
*Assistant Examiner* — Lorne Meade
(74) *Attorney, Agent, or Firm* — Reinhart Boerner Van Deuren P.C.

(57) ABSTRACT

An air cooled core mounted ignition system for gas turbine engine applications is provided. The ignition system includes an ignition exciter component directly mechanically and electrically connected to an igniter component. The housing member of the exciter component includes an air plenum configured to receive bleed air from the engine fan or compressor sections of the turbine engine, or other source. The bleed air provides a relatively low temperature air source for the purpose of cooling the exciter. As such, the exciter component can be directly secured to the igniter, thereby eliminating the need for an ignition lead.

19 Claims, 10 Drawing Sheets

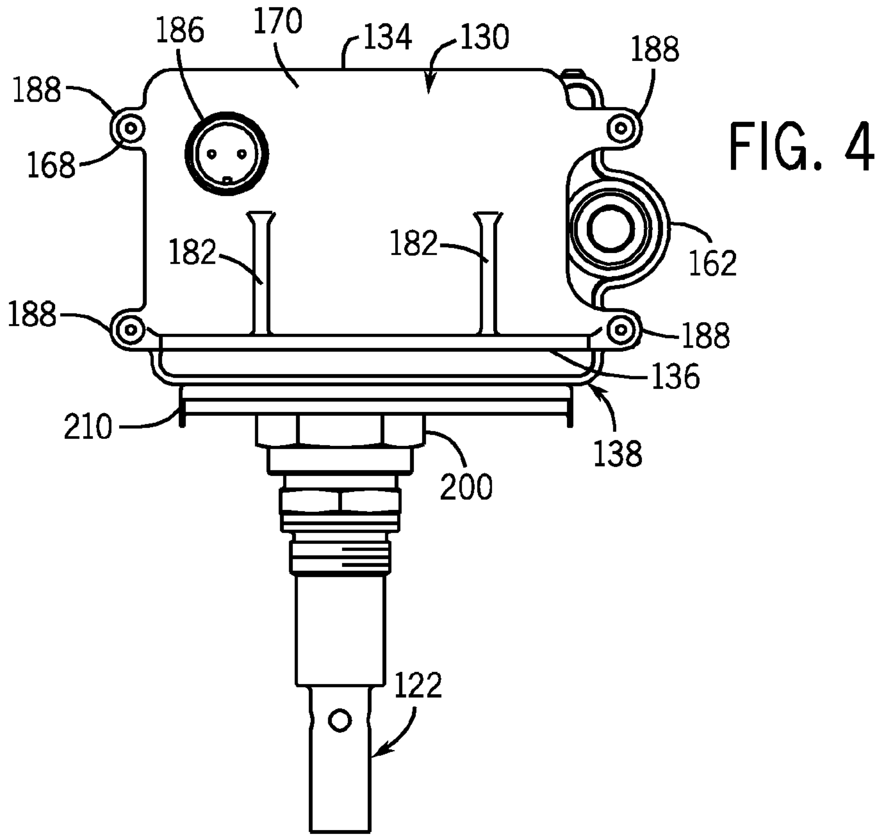
FIG. 4
FIG. 5
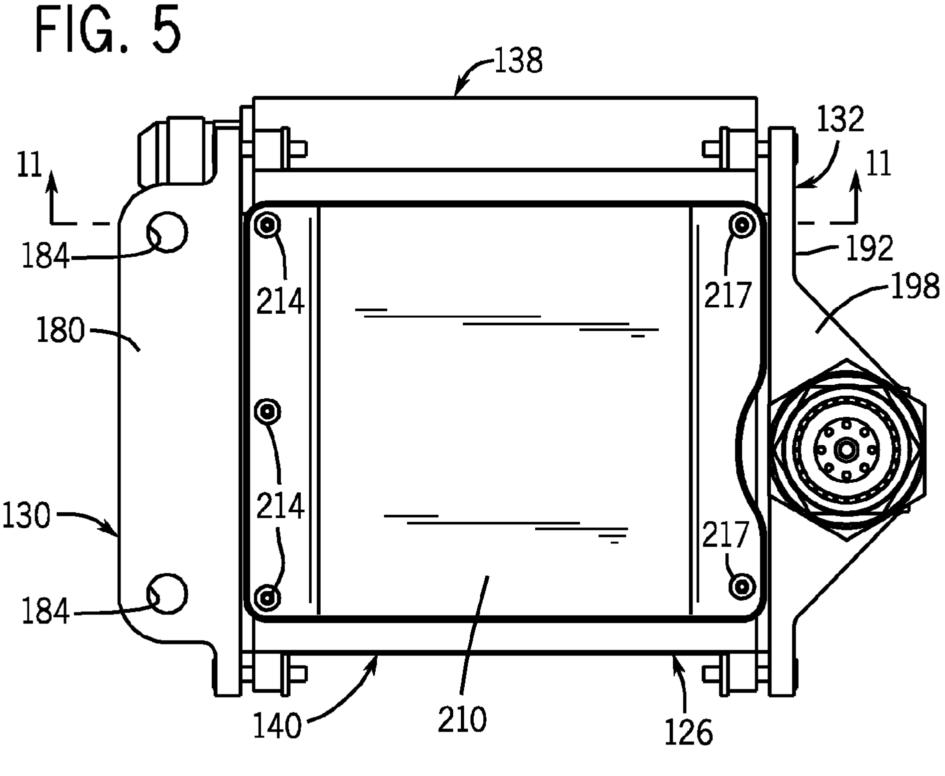

AIR COOLED CORE MOUNTED IGNITION SYSTEM

FIELD OF THE INVENTION

This invention generally relates to turbine engine ignition systems, and in particular to an engine mounted ignition system and a method of constructing such an ignition system for gas turbine engine applications.

BACKGROUND OF THE INVENTION

In its simplest form, a gas turbine engine, of the type typically used in aviation applications, includes, in serial flow communication, a fan section, through which ambient air is drawn into the engine, a compressor for pressurizing the incoming air, a combustor, in which the high pressure air is mixed with atomized fuel and ignited, and a turbine section that extracts the energy from hot gas effluent to drive the compressor and fan, producing desired engine thrust. An augmentor is used primarily to provide extra thrust for relatively short periods of time, which may be required during e.g., takeoff and high speed maneuvers, and can also be included to increase the thrust generated by the engine.

To initiate combustion of the fuel and air mixture within the combustor, a conventional gas turbine engine includes an ignition system comprising an ignition exciter component, at least one igniter plug and an ignition lead assembly coupled between the exciter component and the igniter plugs. The ignition exciter converts ac or dc input power into high voltage high current electrical impulses that are periodically delivered to the igniter plugs to facilitate engine starting. The ignition lead assemblies are electrical conduits that transfer electrical energy between the ignition exciter and the igniter plugs(s). The igniter plugs convert electrical energy into thermal energy, such as an ignition spark, which initiates the combustion process.

In aviation large gas turbine applications, the ignition leads constitute a significant portion of the ignition system weight and cost. Specifically, each lead assembly includes an igniter cable comprising a stranded center conductor encased within electrical insulation and housed within a flexible conduit. The lead assembly conduits must be cooled to minimize degradation thereof resulting from exposure to the high operating temperatures within the engine. In some applications, the ignition leads are air cooled, utilizing fan or compressor bleed air to continuously cool the lead assemblies. The addition of active cooling greatly increases the ignition lead conduit diameter and necessitates the introduction of an integral "Y" shaped fitting on the ignition lead conduit to facilitate interconnection to the cooling air supply.

Ignition leads likewise represent a maintenance burden since they are often damaged during routine engine inspection and maintenance activities. Additionally, environmentally induced thermal and vibratory stresses degrade ignition lead component parts over time necessitating periodic repair and/or overhaul. Indeed, during operation, the center conductor of the ignition lead tends to chafe on the internal conduit and supporting splines. Likewise, the external conduit/braid features of the ignition lead chafe and are damaged by nearby components or structures. Further, the elastomeric seals and center conductor insulation of each of the leads can be thermally degraded by the extremely high temperatures and pressure variations within the operating environment.

Unlike aeroderivative turbine applications, or heavy frame industrial turbine applications, aviation turbine ignition system components are frequently mounted directly on the engine and must operate in extremely harsh environments. As such, ignition systems directed for use in aviation turbine applications require designs that are compact size and minimize the overall weight of the engine. Accordingly, elimination of the ignition leads from an ignition system for a gas turbine engine would be very desirable.

In addition to eliminating the associated cost, weight and maintenance issues, a leadless ignition system would offer improved efficiency over prior art large gas turbine ignition systems. In particular, a typical ignition lead contributes about 35% to the overall ignition system electrical losses.

As such, the invention provides an ignition system that can be directly mounted to the housing of a large gas turbine engine, the system includes an exciter component directly connected to an igniter, eliminating the requirement for an ignition lead connection therebetween. These and other advantages of the invention, as well as additional inventive features, will be apparent from the description of the invention provided herein.

BRIEF SUMMARY OF THE INVENTION

Accordingly, in one aspect, the present invention provides an ignition system including an exciter component mechanically and electrically interconnected to an igniter plug. The exciter housing is configured to receive cooling air, such as fan bleed air, and directs the cooling air around the temperature sensitive exciter components and the exciter/igniter plug interface. This configuration eliminates the ignition leads, and permits the complete ignition system to be mounted directly on the engine casing in close proximity to the combustor and exposed to the high temperature environment thereof without damaging the internal components of the exciter. For example, the ignition system of the present invention can be directly mounted on the exterior surface of the combustor.

Indeed, the present invention provides, at least in part, an ignition system that can be retrofitted into existing gas turbine engine applications, by directing the cooling air that would normally be utilized for cooling the ignition leads to the air input of the exciter housing of the present ignition system. By using cooling air (e.g. fan bleed air or compressor air) to cool the exciter, the safety concerns related to active fuel cooling are eliminated for commercial applications.

The air cooled core mounted ignition system of the present invention is more efficient than prior art ignition systems because the leadless configuration eliminates the losses associated with the ignition lead by directly interconnecting the exciter and igniter. As such, the exciter power throughput can be reduced while maintaining equivalent delivered spark plasma energy. Further, the air cooled core mounted ignition system of the present invention is less expensive to manufacture than conventional prior art large gas turbine engine ignition systems because it eliminates the necessity to provide the ignition leads. The present invention minimizes both system acquisition and life cycle cost of gas turbine ignition systems since associated ignition lead repair and overhaul costs are eliminated.

Further, in certain other aspects, the present invention provides, a lighter weight ignition system than those known in the prior art. By eliminating the igniter leads, the ignition system incrementally reduces turbine engine ignition system weight. As such, the present invention overcomes limitations of the prior art ignition systems by cooling the exciter using engine cooling air and directly interconnecting the exciter and igniter. By using cooling air (e.g. fan bleed air) to cool the exciter, the safety concerns of active fuel cooling are eliminated for commercial applications.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4 is a input end plan view of the air cooled core mounted ignition system shown in FIGS. 1 through 3;

FIG. 5 is a bottom plan view of the air cooled core mounted ignition system shown in FIGS. 1 through 4;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
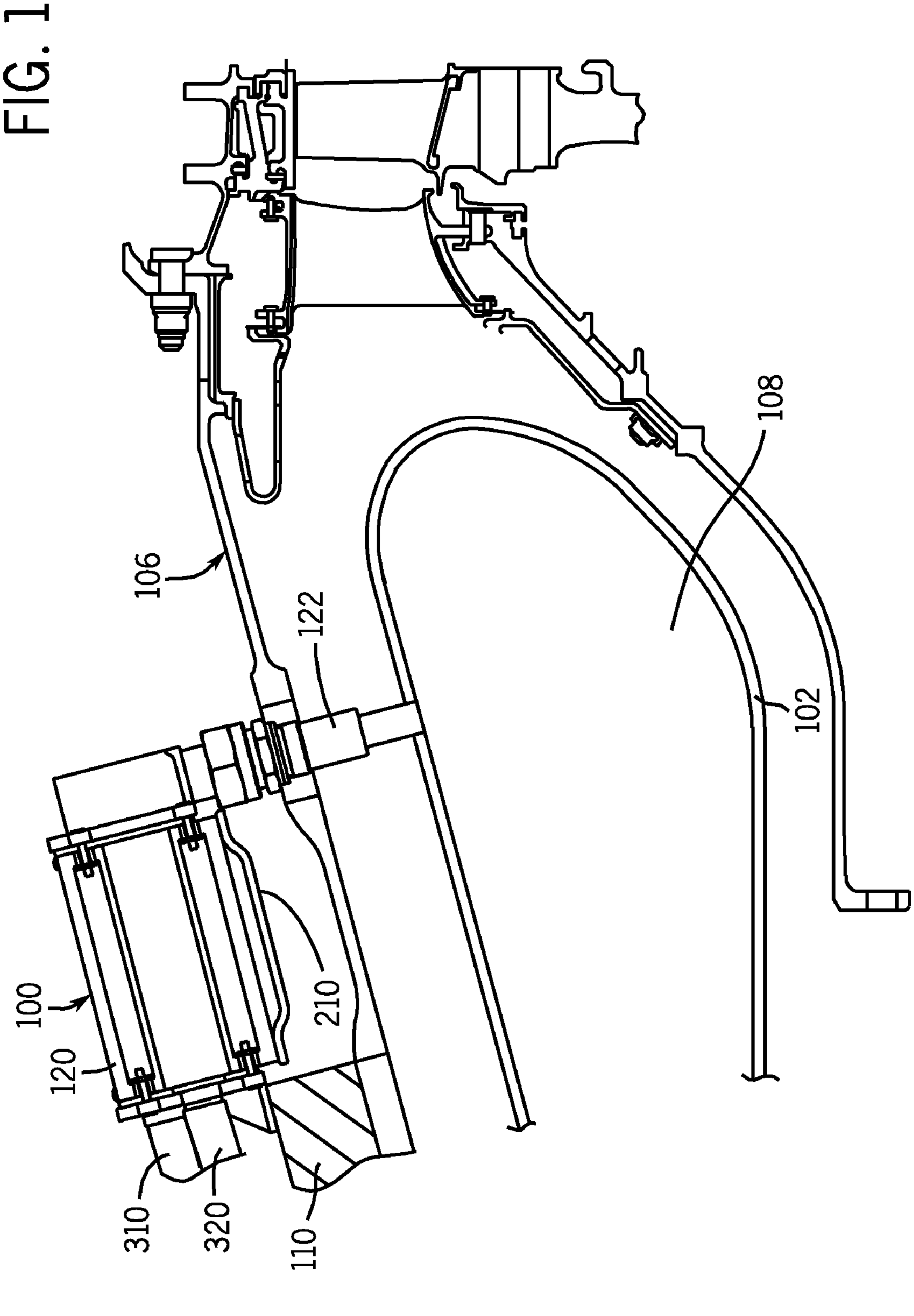
FIG. 1 is a cross sectional view of a combustion chamber positioned within a gas turbine engine including an exemplary embodiment of an air cooled core mounted ignition system of the present invention.

Referring first to FIG. 1, a cross sectional view of a combustor 102 of a gas turbine engine incorporating an igniter system 100 constructed in accordance with the present invention. It will be appreciated that although the ignition system 100 is shown and described with respect to use within the combustor of a large gas turbine engine, such application is intended as only one example of the type of engine or combustion system that can be utilized with the ignition system 100 of the present invention.

The combustor 102 includes a substantially annularly shaped housing or casing 106 having an inner combustion area 108 where the fuel and air mixture provided from the engine's fuel delivery system (not shown) is combusted. As described in more detail below, the ignition system 100 of the present invention is housed within the turbine engine casing, and, in certain preferred embodiments of the present invention, the ignition system 100 can be mounted directly to an external surface 110 of the combustor housing 106.

Turning next to FIGS. 2 through 16, an exemplary embodiment of the ignition system 100 comprises, in its simplest form, an exciter component, indicated generally at 120, directly coupled to and electrically engaged to an igniter, indicated generally at 122. The ignition system 100 can additionally include a heat shield 210 mounted to the bottom surface thereof to minimize radiant heating of the exciter component 120 by the engine combustor.

Figure 13:
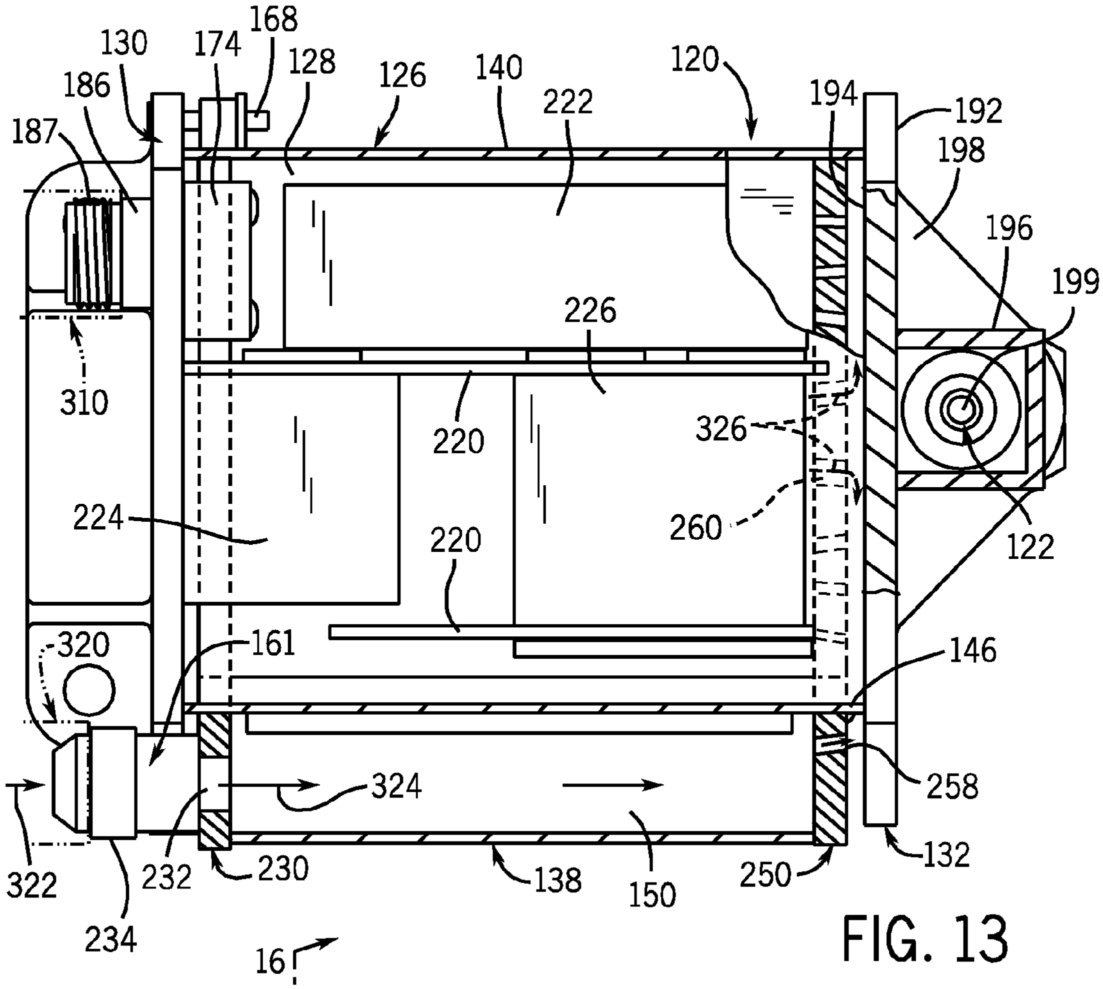
FIG. 13 is a top sectional view of the air cooled core mounted ignition system of the present invention, taken along the line 13-13 in FIG. 3, shown with a top portion of the housing removed, illustrating cooling air flow through the exciter housing.
Figure 14:
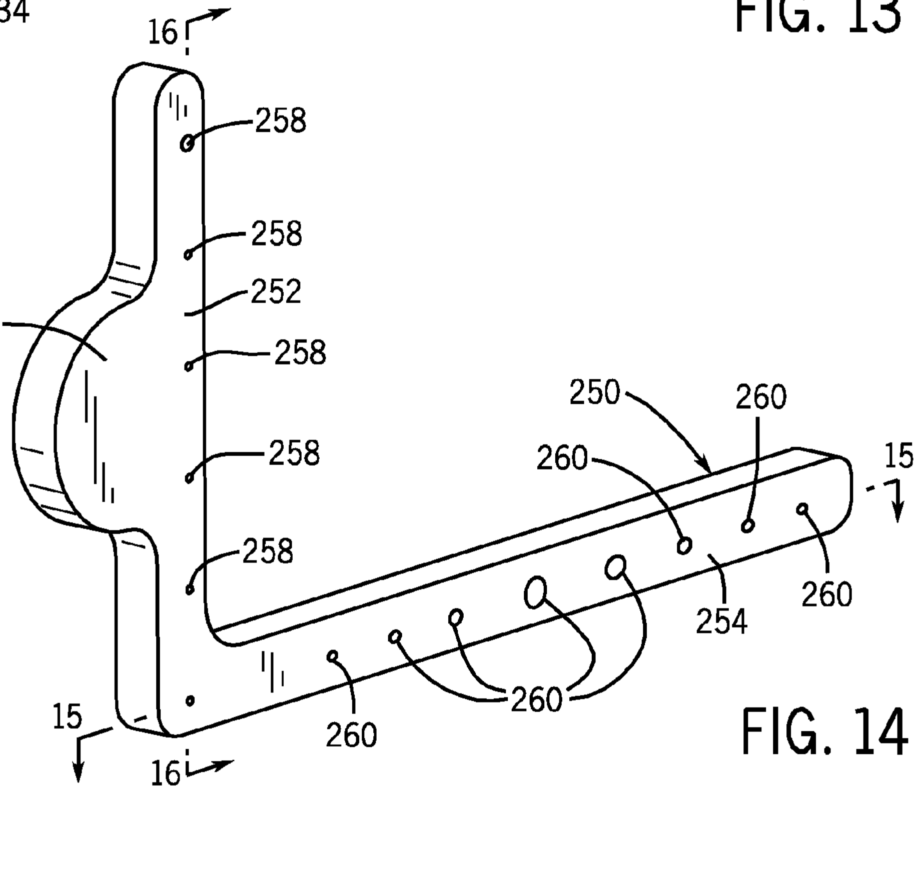
FIG. 14 is a perspective view of one embodiment of a plenum outlet end cap for use within the exciter housing.
Figure 15:
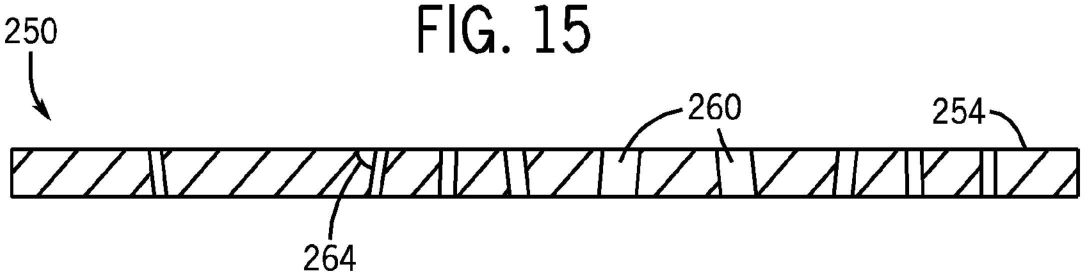
FIG. 15 is a sectional view of the plenum outlet end cap shown in FIG. 14, taken along the line 15-15 thereof, showing a plurality of cooling air apertures, and the air directional angles thereof.
Figure 16:
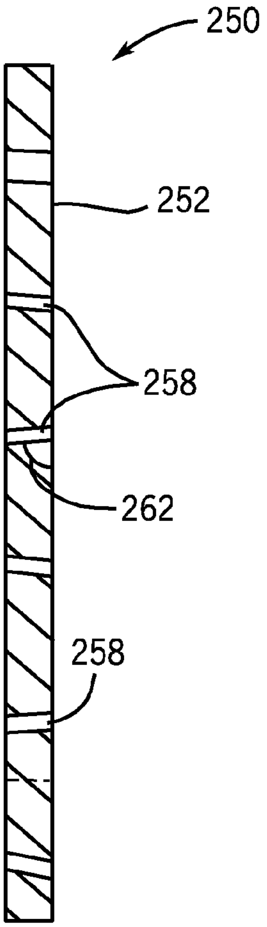
FIG. 16 is a sectional view of the plenum outlet end cap shown in FIG. 14, taken along the line 16-16 thereof, showing a plurality of cooling air apertures, and the air directional angles thereof.

The exciter component 120 includes an open ended housing member, indicated generally at 126, a housing input cover 130 and a housing output cover 132. As best illustrated in FIG. 13, including an exciter component cavity, indicated generally at 128, and an air cooling plenum, indicated generally at 150. The exciter component cavity 128 is defined within the housing member 126 by upper and lower surfaces 134 and 136, respectively, an outer wall, indicated generally at 140, and an intermediate wall, indicated generally at 146, such that the exciter component cavity 128 has a substantially rectangular cross section. It will be appreciated that the exciter housing member 126, including both the exciter component cavity 128 and the air cooling plenum 150, may be of any cross sectional shape or configuration capable of receiving and securely mounting the exciter components therein, as described in more detail herein. Moreover, it will be understood that the exciter component cavity 128 can be circular or oval in cross-section, with the air cooling plenum 150 configured to surround at least a portion of the exterior surface of the exciter component cavity 128.

Figure 7:
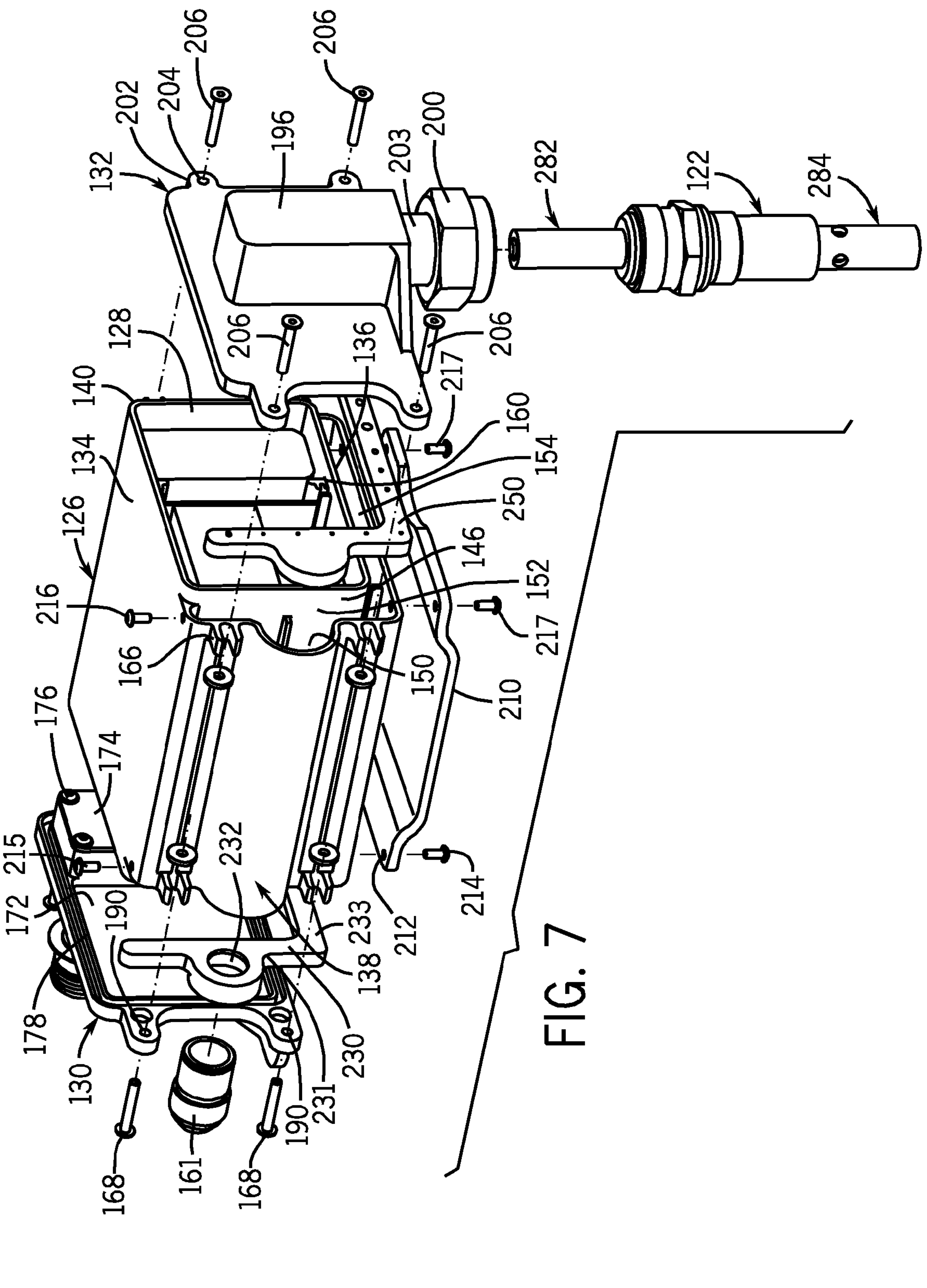
FIG. 7 is an exploded view of the air cooled core mounted ignition system shown in FIGS. 1 through 6.

As shown in FIG. 7, the cooling air plenum 150 of the exciter housing member 126 comprises a side plenum 152 and a bottom plenum 154 forming generally an L-shaped cross section. The cooling plenum 150 is formed by a wall 138 that extends outwardly from substantially the upper surface 134 of the exciter component cavity 128, downwardly and spaced apart from the wall 146 thereof, and around the lower surface 136 to provide cooling air around at least two sides of the exciter component cavity 128. In the exemplary embodiment, "L" shaped cooling air plenum 150 facilitates containment and flow of cooling air around one side and the bottom surface of the exciter component cavity. Accordingly, the sensitive electronic components (e.g. charge pump switching device, primary energy discharge switching device (s) and commutating diode(s)) are preferably secured within the exciter housing 126 on the side 146 thereof adjacent to the side cooling air plenum 152. Likewise, the bottom plenum 154 is intended to maximize removal of unwanted head loads generated by the engine combustor so that the ignition system 100 can be positioned adjacent, or preferably mounted to the combustor housing 106. Consistent with the broader aspects of the present invention, the cooling air plenum 150 can be provided to encompass more than two of the sides or surfaces of the exciter component cavity 128, including an upwardly extending portion surrounding the side wall 140 of the exciter component cavity 128.

The side wall 138 of the side plenum 152 includes a circular portion 162 to facilitate interconnection of the exciter housing 126 with a cooling air fitting component 161, minimizing area required for the side plenum 152 in order to effect sufficient cooling of the exciter components and the igniter. The side wall 138 can also be formed with a plurality of mounting extensions 166 configured to receive a plurality of mechanical fasteners 168 and 206, such as screws or rivets, to mount the housing input cover 130 and the housing output cover 132 respectively thereto.

Consistent with the broader aspects of the present invention, the exciter component 120 can comprise an exciter component cavity 128 including an air cooling plenum 150 that extends through the exciter component cavity 128 from a front to a rear surface thereof. In this configuration, the housing input cover 130 will include a fitting that will connect to an air source 320 and the housing output cover 132 will include a plurality of air openings or apertures, similar to air apertures 258 and 260 shown in FIG. 13, for directing air on to the igniter 122, as will be understood from the description of the invention as recited herein. The internal air plenum can be positioned to extend through the exciter component cavity 128 at any vertical and/or horizontal position through the exciter component cavity.

In certain preferred embodiments of the present invention, the exciter housing member 126 is constructed of a single piece of extruded metal material, such as aluminum. It will be appreciated that the housing may be formed of another material, such as a steel, or a suitable metal alloy, ceramic or composite material, as known to those skilled in the art, and selected based on, at least in part, the operating requirements and environmental conditions within the turbine engine housing. It will further be appreciated that the housing member 126 can be formed by casting, machining or other means for constructing a housing member 126 including the exciter component cavity 128 and cooling air plenum 150 of unitary construction. Additionally, the housing member 126 can be formed by welding or otherwise securing multiple housing pieces together to form the housing member 126 in the manner described above.

Figure 9:
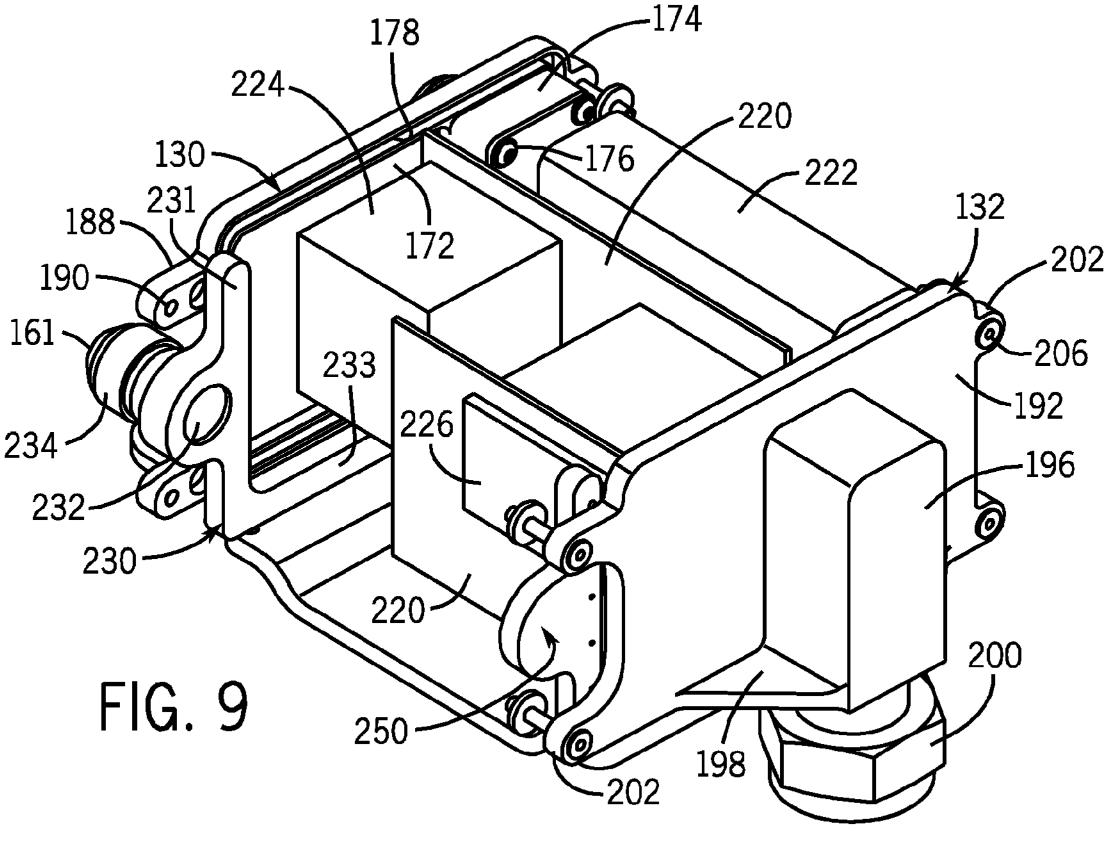
FIG. 9 is an internal view of the exciter housing member shown in FIGS. 1 through 8, illustrating the internally mounted components of the exciter component.

As best illustrated in FIGS. 9 and 13, the electrical exciter components are mounted within the exciter component cavity 128 of the exciter housing 126. These components include, but are not limited to, printed circuit board assemblies (PCBAs), indicated generally at 220, the energy storage (tank) capacitor 222, a power transformer 224 and an output or pulse transformer 226 for generating output pulses for the igniter 122. It will be appreciated by those skilled in the art that the exciter components and circuitry are sized for the predetermined energy and power throughput levels required by the specific gas turbine engine application. It will be further understood by those skilled in the art that the majority of aviation large gas turbine engine ignition systems are powered using 400 Hz AC input power. However, consistent with the broader aspects of the present invention, the exciter charge pump section could easily be configured for other types of AC (e.g., 60 Hz or PMA (Permanent Magnet Alternator) or DC input power, depending on the specific end use application of the ignition system 100. The exciter component cavity 128 can further comprise card guides 160, as illustrated in FIG. 7.

Figure 8:
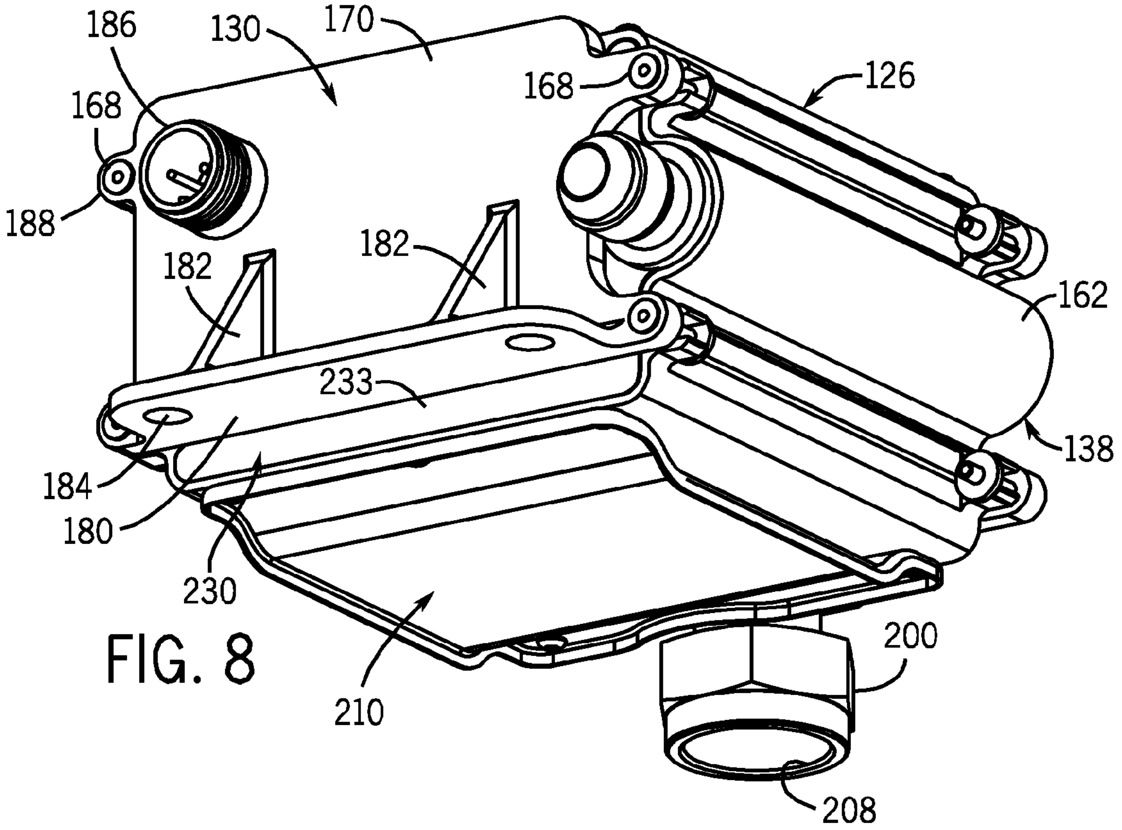
FIG. 8 is an input end perspective view of the air cooled core mounted ignition system shown in FIGS. 1 through 7, illustrated with igniter removed.

As illustrated in FIGS. 8 and 13, the housing input cover 130 is sized to abut and sealingly engage the open input end of the housing member 126 and has an exterior surface 170 and an interior surface 172. The housing input cover 130 includes a plurality of extending tabs 188 having apertures 190 for receiving the rivets, screws or mechanical fasteners 168. The mounting tabs 188 and fasteners 168 are used to secure the housing input cover 130 to the open input end of the exciter housing member 126. Although the housing input cover 130 is also preferably sealingly joined to the housing 126, as described in more detail herein, the fasteners 168 ensure mechanical retention of the housing input cover 130 without compromising the soldered, welded, or otherwise environmentally or electrically conducting seals.

Figure 2:
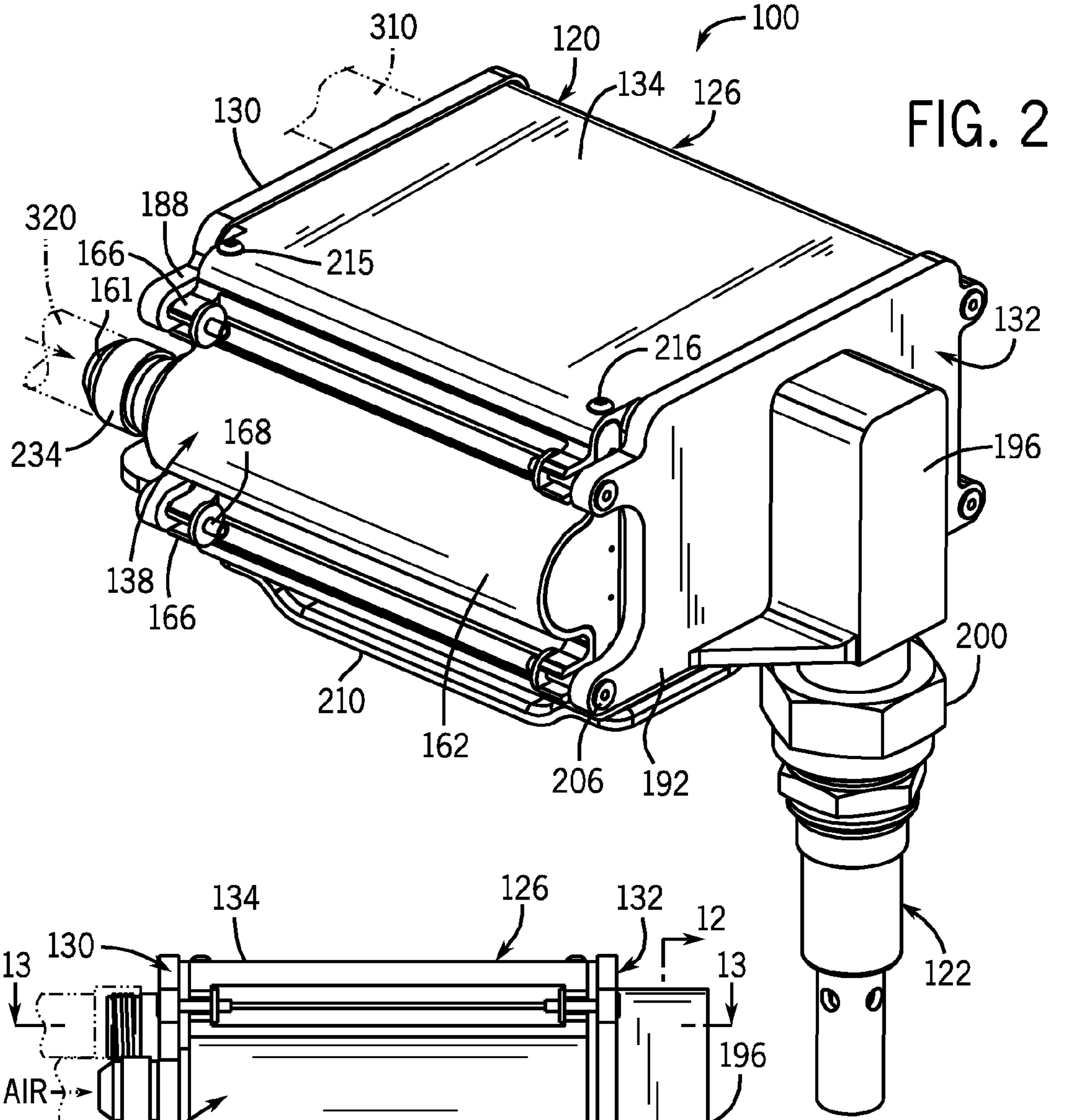
FIG. 2 is a side perspective view of the air cooled core mounted ignition system shown in FIG. 1, illustrating an exciter component directly connected to an igniter component.
Figure 3:
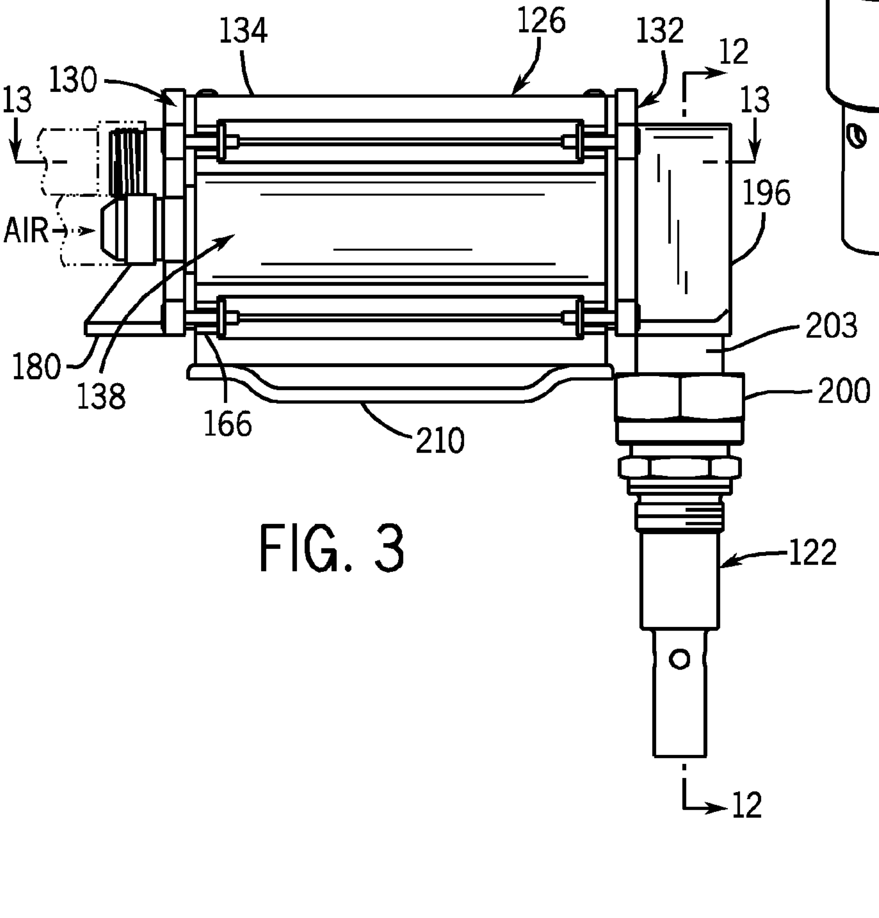
FIG. 3 is a side plan view of the air cooled core mounted ignition system shown in FIGS. 1 and 2.

An electrical connector 186, preferably including threads 187 or similar interconnection means, is secured to the exterior surface 170 of the housing input cover 130 and configured to connect to a power input 310 (as shown in FIG. 2). The connector 186 can also be used to provide control inputs that adjust ignition parameters such as spark rate and/or energy. The connector 186 may likewise be used to facilitate output of exciter/ignition system diagnostic/prognostic information, as will be appreciated by those skilled in the art.

A mounting flange 180 is disposed substantially perpendicularly outwardly from the bottom edge of the input cover 130 and includes mounting apertures 184 so that the ignition system 100 can be secured to the engine casing, as illustrated in FIG. 1. Preferably, the exterior surface 170 of the housing input cover 130 also includes gussets 182 to enhance the strength and vibration/shock tolerance of the exciter housing 126. Further, the gussets 182 are included to prevent flexing and breakage of the mounting flange 180 during operation of the engine. The gussets 182 can be integrally formed with the housing input cover 130, or alternatively can be welded, brazed or soldered thereto.

An electro magnetic interference (EMI) filter assembly 174 is mounted to the interior surface 172 of the housing input cover 130 using fasteners 176 to accept the input voltage from the power input 310. The filter assembly 174 can be configured in, for example, either simple first order L-C, Pi, T, or common/differential mode topology (depending on the specific requirements of an application) to protect sensitive exciter electronics, and surrounding systems in close proximity to the exciter from conducted/radiated emissions/susceptibility, as is well known to those skilled in the art. The EMI filter 174 may also incorporate reverse polarity diode protection to protect the exciter from inadvertent application of incorrect input polarity in the case of a DC powered variant.

In certain preferred embodiments of the present invention, the interior surface 172 of the housing input cover 130 contains a groove 178 used to contain/control the flow of solder used to hermetically seal the input cover 130 to the housing member 126. It will be appreciated by those skilled in the art, that the housing input cover 130 can be sealed to the exciter housing member 126 using an alternate sealing technology, such as welding, brazing or bonding.

The housing input cover 130 is formed from a material capable of forming a sufficient seal with both the housing member 126 and the input fitting or connector 186, taking into account the thermal expansion properties of the materials selected. The materials preferably include aluminum or steel; however, another suitable metal or alloy material, ceramic material or composite material can be used. In certain preferred embodiments of the present invention, the housing input cover 130 can be constructed of an aluminum material and the input connector 186 can be constructed of a stainless steel material. As such, the stainless steel and/or aluminum surfaces are conventionally treated or prepared, by fluxing, tinning or otherwise plating such surfaces, to provide a sufficient seal therebetween, as is known to those skilled in the art. In certain other embodiments of the present invention, the housing input cover 130 can be constructed of stainless steel to eliminate the complication of dissimilar metals and joining methods.

As illustrated in FIGS. 9 and 13, the housing output cover 132 is sized to abut and sealingly engage the open output end of the housing member 126 and has an exterior surface 192 and an interior surface 194. The housing output cover 132 includes a plurality of extending mounting tabs 202 having apertures 204 for receiving a plurality of rivets, screws or mechanical fasteners 206. The mounting tabs 202 and fasteners 206 are used to secure the housing input cover 132 to the open output end of the exciter housing member 126. The interior surface 194 of the housing output cover 132 may also contain a groove (not shown) used to contain/control the flow of solder used to hermetically seal the output cover 132 to the housing member 126. It will be appreciated by those skilled in the art, that the housing output cover 132, like the input cover 130, can be sealed to the exciter housing member 126 by another sealing method, such as welding, brazing or bonding.

An enclosure 196 is secured to the exterior surface 192 of the housing output cover 132. Gussets 198, mounted on opposing opposite sides of the enclosure 196, securely retain the enclosure 196 in place on output cover 132.

Figure 6:
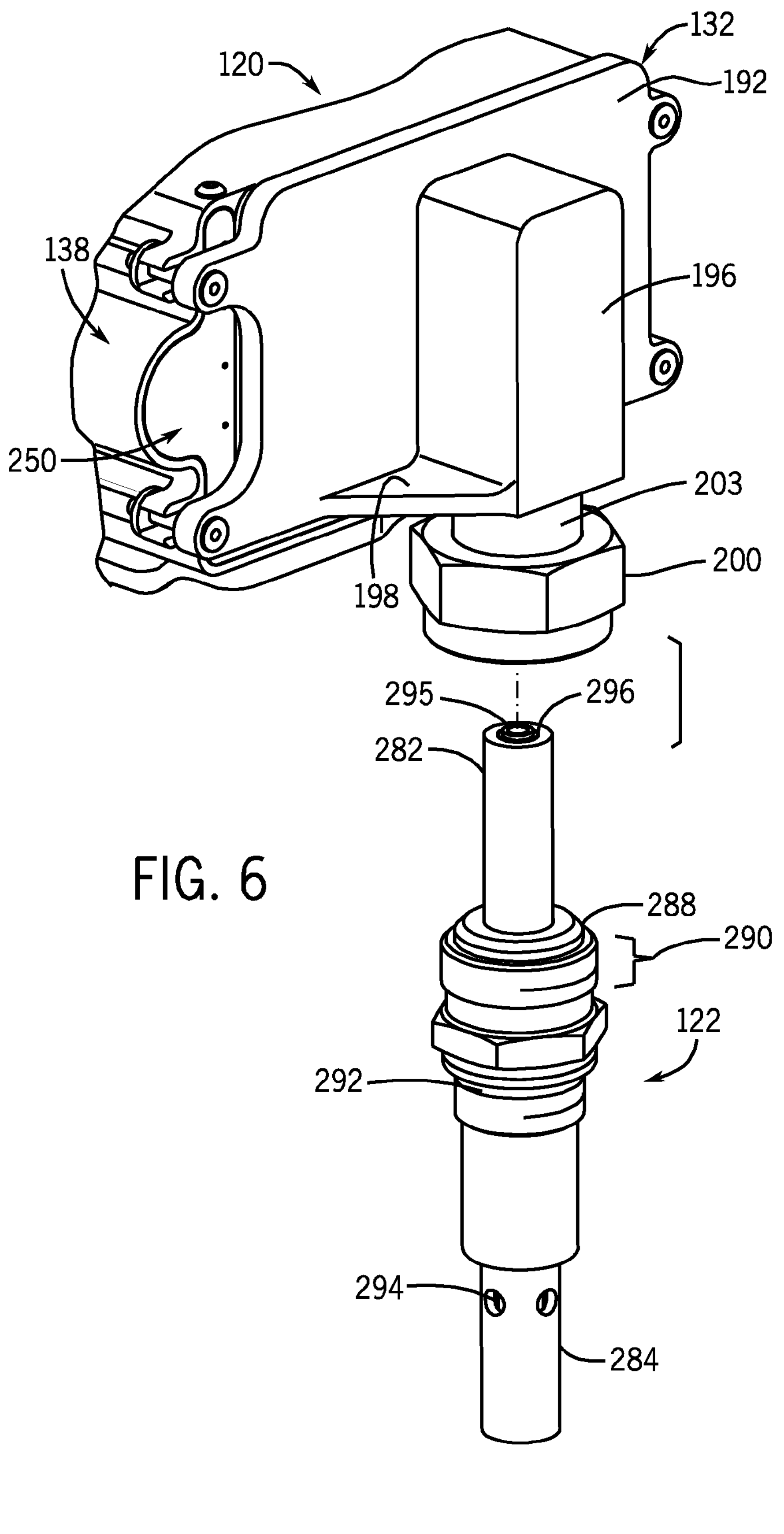
FIG. 6 is a partial view of the air cooled core mounted ignition system shown in FIGS. 1 through 5; illustrating the igniter plug axially aligned with, but separated from the exciter component before installation of the igniter plug into the exciter housing.
Figure 12:
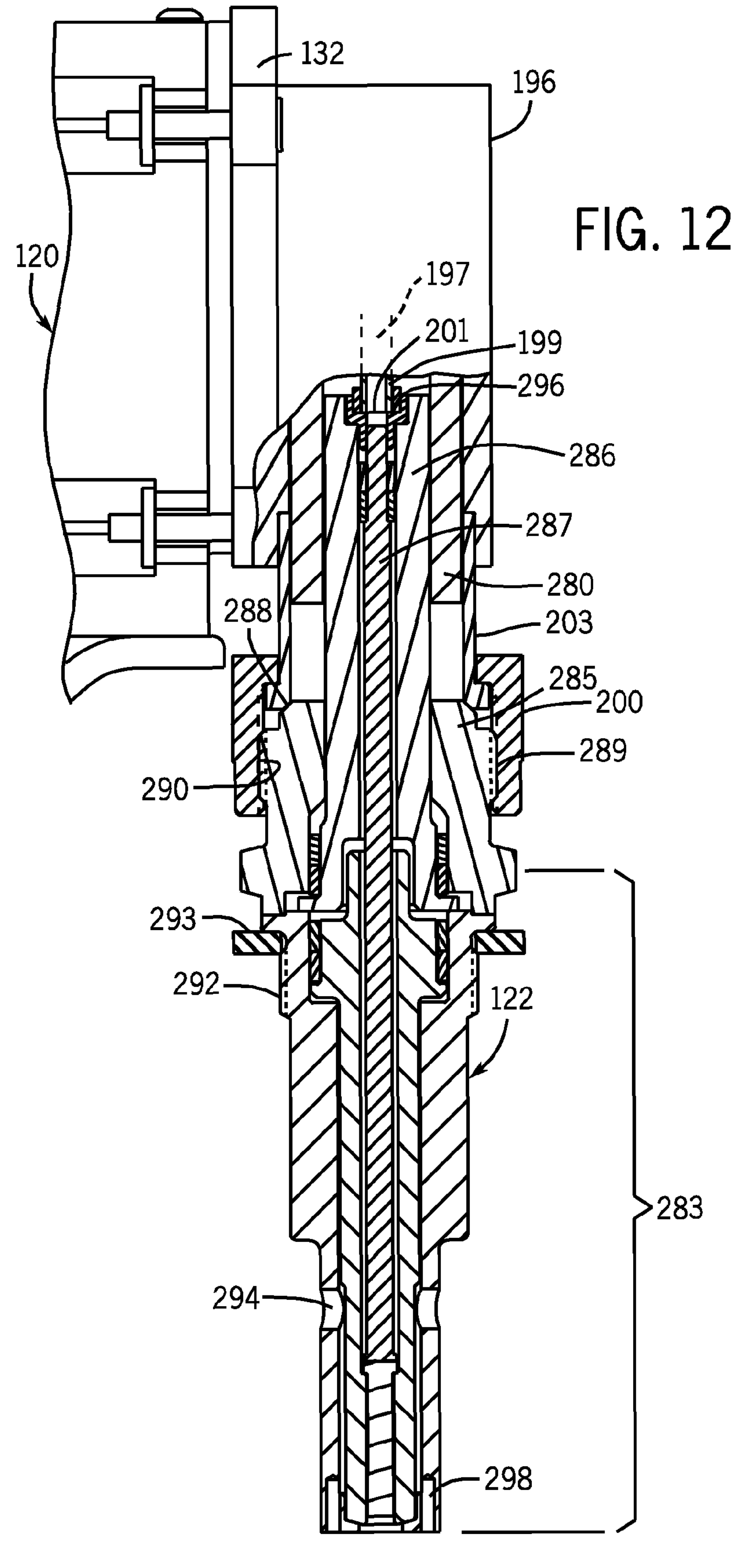
FIG. 12 is a sectional view of the air cooled core mounted ignition system, taken along the line 12-12 in FIG. 3, illustrating direct physical and electrical interconnection of the exciter component and the igniter.

As best illustrated in FIGS. 6, 8 and 12, the enclosure 196 houses a substantially annular, insulating sleeve 280 including a high voltage coupling 199. The high voltage coupling 199 includes a first conductive portion 197 electrically engaged to the exciter output transformer 226 and includes high voltage contacts or terminals 201 configured to electrically engage the igniter 122. Additionally, the enclosure 196 has an annular extension 203 to securely support the igniter 122 along its length. A fitting or connector 200, preferably having threads 208, is secured to the extension 203 and physically retains the igniter 122 in position next to the exciter housing 126. The extension 203 and the connector 200 also ensure electrical engagement between the igniter 122 and the contacts 201 of the high voltage coupling 199. As will be understood, the electrical coupling 199 is preferably selected, at least in part, based on the voltage requirements and operating temperature, pressure and end use application of the turbine engine. As such, the ignition system 100 includes an electrical coupling 199 providing direct mechanical and electrical interconnection between the exciter component 120 and the igniter 122.

It will be appreciated that like the housing input cover 130, the housing output cover 132, and the enclosure 196, are formed from a material capable of forming a sufficient seal with the housing member 126, and the electrical coupling 199. Such materials preferably include aluminum or steel, or alternatively another suitable metal or alloy material, a ceramic or a composite material. In certain preferred embodiments of the present invention, the housing output cover 132 can be constructed of an aluminum material. In certain other embodiments of the present invention, the housing output cover 132 can be constructed of stainless steel to eliminate the complication of dissimilar metals and joining methods.

Figure 10:
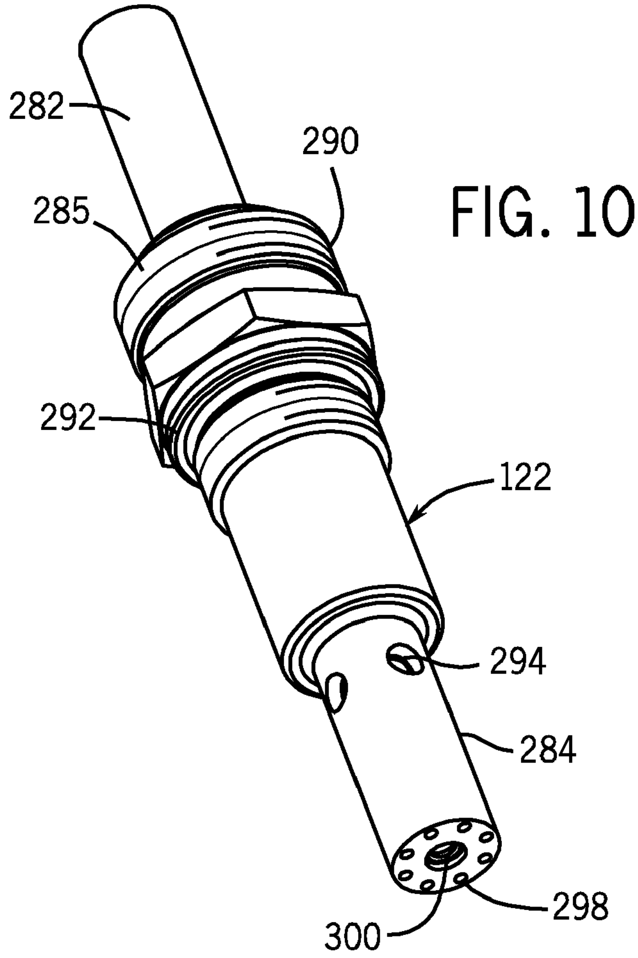
FIG. 10 is a perspective view of an exemplary embodiment of an igniter plug for use in the air cooled core mounted ignition of the present invention.
Figure 11:
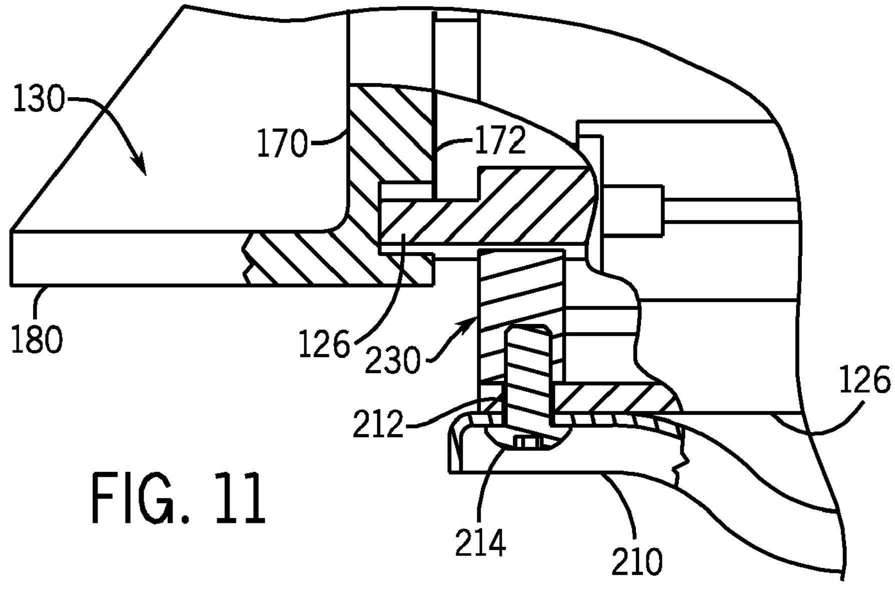
FIG. 11 is a sectional view of the air cooled core mounted ignition system of the present invention, taken along the line 11-11 in FIG. 5, showing the connection of the heat shield to the air cooling plenum

As illustrated in FIGS. 10 and 12, an exemplary igniter 122 configured to interface directly with the ignition exciter 120 is shown. The igniter 122 includes an upper end, indicated generally at 282, configured to electrically engage the high voltage coupling 199 of the exciter 120 and a lower end, indicated generally at 284 that is at least partially disposed within the combustion area 108, as shown in FIG. 1. It will be appreciated that the end 284 of the igniter 122 includes a spark gap 300, and can optionally include a plurality of ventilation apertures 298.

As shown in FIG. 12, in certain preferred embodiments of the present invention, the igniter 122 has an annular housing or casing, indicated generally at 285, that comprises a layer of electrical insulation 286 surrounding an igniter electrode 287, as is well known to those skilled in the art. The external diameter of the housing 285 is sized so as to sealingly engage the electrical coupling 199, the support extension 203 and the threaded connector 200.

As such, the igniter housing 285 further includes a connector 290 having threads 289 so that the igniter 122 can be, preferably, removably secured to the connector 200 on the exciter housing 126. A pressure sealing ferrule 288 can also be provided on the igniter 122 to seal the igniter 122 in place against the support extension 203. The ferrule 288 retains atmospheric pressure within the interconnection, preventing dielectric flashover at altitude, and prevents introduction of contamination or moisture into the interconnection. The igniter 122 also includes an engine or combustion chamber connector 292 so that the igniter 122 can be secured into the combustion chamber. A gasket 293 is used to seal the igniter/engine combustor interface to prevent escape of combustion chamber gases. Further, cooling holes 294 can be optionally included near the bottom portion 284 of the igniter 122 to channel compressor discharge air through the igniter firing end, as is well known to those skilled in the art. It will be appreciated that in alternate embodiments of the present invention, the igniter 122 can be secured into the combustion chamber by any means known to those skilled in the art, such as using a threadless or cartridge type igniter housing 285, as will be well known to those skilled in the art.

A high voltage contact or terminal 296, such as a spring connection, positioned on the end 295 of the igniter 122 is configured to engage the contacts 201 of the high voltage coupling 199. In particular, the spring connection ensures that complete electrical connection between the igniter 122 and exciter is established and maintained, despite mechanical tolerances and the substantial vibration and harsh operating environment of the ignition system 100.

It will be appreciated that the igniter components are sized, both mechanically and electrically, for the particular gas turbine engine requirements. As shown in FIG. 12, the igniter 122 can include a portion 283 comprising any type of gas turbine igniter technology known to those skilled in the art and selected for the given ignition application. In particular, the portion 283 of the igniter 122 can be mechanically and electrically configured to be retrofitted into an existing gas turbine engine application, as will be appreciated by those skilled in the art.

Referring to FIGS. 7 and 9, the air plenum input cap 230 is a plate-type member, having a substantially L-shaped cross section, including an upwardly extending portion 231 to seal the input end of the side air plenum 152 of the air plenum 150 closed and an outwardly extending portion 233 to seal the input end of the bottom plenum 154 closed. The upwardly extending portion 231 of the air plenum input cap 230 includes a substantially circular opening 232 for mounting the air input connector 161 thereto. The air plenum input cap 230 is preferably secured in position using mechanical fasteners 214 and 215. Alternatively, the air plenum input cap can be welded, brazed or soldered in place, as will be well known to those skilled in the art. It will be appreciated that the air input connector 161 can include threads 234 so that fan air, or air from another source 320 can be supplied to the input connector 161, as indicated in FIG. 1. It will be appreciated that the cooling air source 320 can be channeled from a number of engine sources, or alternatively, cooling air can be supplied to the ignition system 100 by a non-engine system and/or by a dedicated pump/supply system so that following engine shutdown cooling air will still be supplied to the system to rapidly cool the exciter and prevent thermal distress during thermal soakback.

Turning now to FIGS. 7 and 14 through 16, the air plenum output cap 250 is shown. The air plenum output cap 250 is a plate-type member, having a substantially L-shaped cross section, including an upwardly extending portion 252 to enclose the output end of the side air plenum 152 and an outwardly extending portion 254 to enclose the output end of the bottom plenum 154. The air plenum output cap 250 is preferably secured in position using mechanical fasteners 216 and 217. Alternatively, the air plenum output cap 250 can be welded, brazed or soldered in place, as will be well known to those skilled in the art.

The upwardly extending portion 252 of the air plenum output cap 250 includes a plurality of air cooling apertures 258 to control the air volume and flow rate through the cooling air plenum 150. Likewise, the outwardly extending portion 254 of the air plenum output cap 250 includes a plurality of air cooling apertures 260. The apertures 258 and 260, respectively, can be formed of any size, number or pattern required by a given application in order to adequately ensure cooling of the exciter component 120. Additionally, the apertures 258 and 260 can be formed within the air plenum output cap 250 at any angle of orientation 262 and 264, respectively, in order to direct the outlet cooling air to sensitive components, such as to the electrical coupling 199, the exciter/igniter interface, or igniter shaft, as will be appreciated by those skilled in the art. In particular, the apertures 258 and 260 provide continuous cooling to exciter housing output cover 132 to cool the exciter/igniter interface, which can be a major heat conduction path from the engine combustor.

The heat shield 210 is secured to the exciter housing 126 beneath the bottom air cooling plenum 154 to further reduce the exposure of the exciter 120 to radiant thermal energy from the engine. As such, the heat shield 210 can be constructed of any type of material capable of sufficiently insulating the exciter component 120. A plurality of mounting apertures 212 and mechanical fasteners 214 are provided to mount the heat shield 210 to the exciter component.

The ignition system is preferably mounted within the gas turbine engine directly on to the external surface 110 of the combustion chamber housing 106. In certain preferred embodiments of the present invention, the ignition system 100 is mounted using a three (3) point mount by inserting threaded fasteners through the apertures 184 on the mounting flange 180 of the housing input cover 130, in addition to mounting the igniter 122 to the combustion chamber by threading it onto a boss or other engine interface.

Without limitation to any particular theory of mode of operation, one example of the air flow through the air cooled ignition system 100 of the present invention is illustrated in FIG. 13. Cooling air 322 from a cooling air source 320 (shown in FIG. 1) is supplied to the air cooling plenum 150. As recited herein, the air source 320 can be engine bleed air, or auxiliary (e.g APU) discharge air, or air from another airframe source or system as will be appreciated by those skilled in the art. The input air 324 travels through the side and bottom plenums 152 and 154 respectively, and air 326 is directed out of the plenums through the cooling air apertures 258 and 260 thereof. As can be seen, air 326 is directed to the housing outlet cover 132, towards the enclosure 196, and thus, the high voltage coupling 199 and the electrical interface between the exciter 120 and the igniter 122.

As such, the present invention provides an ignition system 100 incorporating substantially continuous cooling of the exciter component 120, permitting the entire ignition system 100 to be mounted to the outer surface of the combustion chamber, eliminating the need for ignition system lead components. Accordingly, the ignition system 100, including the exciter 120 and igniter components of the present invention, allows the use of existing semiconductor switching technologies ($T_j$<175° C.) and traditional passive component, interconnect and packaging technologies.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An ignition system mounted directly to a housing of a gas turbine engine, adjacent to an engine combustor, the ignition system comprising: an exciter component comprising a housing enclosure having exterior surfaces, the exciter component further including an electrical input and an output high voltage electrical coupling device; a cooling air plenum secured around at least a portion of at least one surface of the housing enclosure, the plenum having an air inlet connector and a plurality of air outlets; and an igniter component having a first end electrically engaged to and received within the output high voltage electrical coupling device and a second end extending into the engine combustor, wherein cooling air is supplied to the air inlet connector from a continuously supplied air source.

2. The ignition system of claim 1, wherein the housing enclosure is constructed of an extruded aluminum material.

3. The ignition system of claim 1, wherein the housing enclosure includes top, bottom and opposing closed sides and further includes first and second open ends.

4. The ignition system of claim 3, wherein the first open end of the housing enclosure is sealed closed by an input cover including the electrical input secured to an outside surface thereof.

5. The ignition system of claim 4, wherein the input cover includes an EMI filter secured to an inside surface thereof, the EMI filter oriented on the input cover to align with the electrical input.

6. The ignition system of claim 3, wherein the second open end of the housing enclosure is sealed closed by an output cover including the output high voltage electrical coupling device of the exciter component secured to an outside surface thereof.

7. The ignition system of claim 3, wherein the cooling air plenum comprises at least one side plenum encompassing and integrally formed with at least one of the opposing closed sides of the housing enclosure, respectively, and a bottom cooling air plenum encompassing the bottom side of the housing enclosure.

8. The ignition system of claim 3, wherein the cooling air plenum is defined by an exterior surface including a wall and an inner surface comprising the bottom and at least one side of the housing enclosure, and wherein the cooling air plenum has an open air input end and an opposing open air outlet end.

9. The ignition system of claim 8, wherein the open air input end of the cooling air plenum is sealed using an input end cap, the input end cap including an opening for securing the air inlet connector therein, wherein the open air outlet end of the cooling air plenum is sealed using an outlet end cap, the outlet end cap including the plurality of air outlets formed therein.

10. The ignition system of claim 9, wherein at least a portion of the plurality of air outlets are formed at an angle within the outlet end cap.

11. The ignition system of claim 1, wherein the supplied air source is engine fan bleed air.

12. The ignition system of claim 1, further comprising a heat shield directly mounted to a bottom portion of the housing component.

13. An ignition system for a gas turbine engine comprising: a housing component including an exciter cavity formed integrally with an air cooling plenum, the housing component including upper and lower surfaces, opposing side edges and opposing input and output ends, the input end of the housing component including an electrical input in communication with the exciter cavity and an air inlet connection in communication with the air cooling plenum, wherein the output end of the housing component further includes an electrical outlet in communication with the exciter cavity and a plurality of air outlets in communication with the air cooling plenum; an exciter component mounted within the exciter cavity in electrical engagement with the electrical input and the electrical outlet of the housing component; and an igniter component having a first end electrically engaged to and received within the electrical outlet of the housing component and a second end extending into a combustion zone of the gas turbine engine, wherein cooling air is supplied to the air inlet connection to provide air flow through the air cooling plenum; the ignition system directly mounted to an external surface of a combustion chamber of the gas turbine engine.

14. The ignition system of claim 13, wherein the housing component is formed of extruded metal.

15. The ignition system of claim 13, wherein the air cooling plenum of the housing component is substantially L shaped in cross section and surrounds at least one side of the exciter cavity.

16. The ignition system of claim 13, wherein at least a portion of the plurality of air outlets are formed at an angle within the output end of the housing component.

17. The ignition system of claim 13, wherein a cooling air source comprising at least one of fan air, compressor air, APU supplied air, and air from an airframe system is secured to the air inlet connection of the air cooling plenum.

18. A method of constructing a leadless ignition system for a gas turbine engine comprising: providing an ignition exciter component comprising an electrical inlet connector, an EMI filter, a charge pump and a capacitor, the exciter component disposed within a housing enclosure and including an external electrical output coupling device in electrical engagement with the exciter component; forming an air cooling plenum around at least one surface of the housing enclosure, wherein the air cooling plenum has an air inlet connector and a plurality of air outlets, at least a portion of the air outlets formed to direct cooling air at the external electrical coupling device on the housing enclosure; removably securing an igniter component directly to the external electrical output coupling device; mounting the housing enclosure including the secured igniter component directly to an external surface of a combustion chamber of the gas turbine engine; and channeling a source of cooling air to the air inlet connector to effect a sufficient amount of cooling on at least one of the exciter component and the igniter component.

19. The method of claim 18, wherein the cooling air is channeled from a fan section of the gas turbine engine.

* * * * *